US007669198B2

(12) United States Patent
Chitale

(10) Patent No.: US 7,669,198 B2
(45) Date of Patent: Feb. 23, 2010

(54) ON-DEMAND TRANSLATOR FOR LOCALIZED OPERATING SYSTEMS

(75) Inventor: Poonam Parijat Chitale, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 10/992,585

(22) Filed: Nov. 18, 2004

(65) Prior Publication Data

US 2006/0130006 A1 Jun. 15, 2006

(51) Int. Cl.
G06F 9/44 (2006.01)
G06F 17/28 (2006.01)

(52) U.S. Cl. .......................................... 717/173; 704/2
(58) Field of Classification Search ................. 717/100, 717/115, 122, 136, 143, 173–174; 704/2–5, 704/8–9, 277–278; 703/6, 24; 715/856, 715/801
See application file for complete search history.

(56) References Cited

U.S. PATENT DOCUMENTS

| 5,140,522 | A | * | 8/1992 | Ito et al. ........................ 704/2 |
| 5,349,368 | A | * | 9/1994 | Takeda et al. ................ 345/684 |
| 5,583,761 | A | * | 12/1996 | Chou ........................... 715/201 |
| 5,669,000 | A | | 9/1997 | Jessen et al. |
| 5,801,679 | A | * | 9/1998 | McCain ....................... 715/856 |
| 5,978,754 | A | * | 11/1999 | Kumano ......................... 704/3 |
| 6,337,696 | B1 | * | 1/2002 | Lindhorst et al. ........... 715/763 |
| 6,691,100 | B1 | | 2/2004 | Alavi et al. |
| 6,735,759 | B1 | | 5/2004 | Yamamoto et al. |
| 2001/0029455 | A1 | * | 10/2001 | Chin et al. ................... 704/277 |
| 2004/0167768 | A1 | * | 8/2004 | Travieso et al. ................ 704/2 |

FOREIGN PATENT DOCUMENTS

| JP | 05-197685 | 8/1993 |
| JP | 07-084765 | 3/1995 |
| JP | 2001-222416 | 8/2001 |
| WO | WO 00/05660 | 2/2000 |

OTHER PUBLICATIONS

*Separating Strings from Standard Graphical User Interface Resources for Translation and Builds*, IBM Technical Disclosure Bulletin, vol. 39, No. 03, Mar. 1996.
*Tool to Aid Translation of Web Pages into Different National Languages*, IBM Technical Disclosure Bulletin, vol. 41, No. 01, Jan. 1998.
*Method to Convert Graphical User Interface Definitions and Windows to HyperText Markup Language*, IBM Technical Disclosure Bulletin, vol. 40, No. 08, Aug. 1997.

* cited by examiner

*Primary Examiner*—Tuan Anh Vu
(74) *Attorney, Agent, or Firm*—Cuenot, Forsythe & Kim, LLC

(57) ABSTRACT

A method of testing a computer program written for use in a foreign language can include identifying text presented upon a display screen, wherein the text is in a first language, and automatically acquiring the text from the display screen. The text can be translated from the first language to a second language. The translated text can be presented in the second language upon the display screen.

12 Claims, 4 Drawing Sheets

ON-DEMAND TRANSLATOR FOR LOCALIZED OPERATING SYSTEMS

BACKGROUND

1. Field of the Invention

The present invention relates to testing computer programs and, more particularly, to testing computer programs that utilize different languages.

2. Description of the Related Art

Software, whether system software or application software, is subjected to extensive testing to ensure that the final product is free from defects. Typically, software is tested by a quality assurance (QA) engineer or other personnel. The QA engineer subjects the software to various tests and compares the output of the software against known or expected results.

As software has become a global market, the potential user base for a given software title may speak any of a number of different languages. As a result, software may be configured to utilize the English language when sold in the U.S.A., the Japanese language when sold in Japan, Italian when sold in Italy, etc. Such is the case not only with regard to application programs, but also with system software such as operating systems, particularly localized operating systems executing within a single machine.

This linguistic complexity can exacerbate the already difficult task of testing software. Essentially, each linguistically different version of a program must be independently tested. That is, the Japanese version of a software title often is tested and verified independently of the English version or the Italian version. In order to adequately test such software, however, the QA engineer must be able to comprehend text that the software under test presents upon a display screen.

To date, several different techniques for testing software in different languages have been used. One involves hiring a QA engineer that is proficient in each relevant language. A QA engineer that is proficient in Japanese can test programs intended for Japanese speaking users. A QA engineer that is proficient in English can test programs intended for English speaking users.

Another technique is to utilize QA engineers that are proficient in only a single language and manually translate text from the display screen as needed. The QA engineer begins testing a program that is intended for users that speak a language that is foreign to, or different from, that of the QA engineer. As text is presented upon the display in the foreign language, the QA engineer manually selects, copies, and pastes the text into a translation program. The translation program translates the text into a language in which the QA engineer is proficient thereby allowing the QA engineer to review the text properly.

Yet another alternative is to pair a human translator with the QA engineer. This approach can be useful in cases where the text to be translated in not selectable. The human translator can translate text from the display screen as needed throughout the testing process. Each of these techniques, however, requires significant resources in terms of personnel, time, and cost.

SUMMARY OF THE INVENTION

The present invention provides a solution for testing software intended for users that speak different languages. One embodiment of the present invention can include a method of testing a computer program written for use in a foreign language. The method can include displaying a computer desktop that includes a program written for use in a foreign language on a display screen, and identifying all text presented within the display screen and automatically acquiring the text. The text can be in a first language. The method also can include translating the text from the first language to a second language and reproducing the computer desktop that includes the program written for use in the foreign language, utilizing text from the second language.

Another embodiment of the present invention can include a system for testing a computer program written for use in a foreign language. The system can include a display means for displaying a computer desktop that includes a program written for use in a foreign language, an interface to a computer program under test. The interface can identify all text that is presented upon the display means and automatically acquire the text. The text can be in a first language. The system further can include a translator configured to translate the text from the first language to a second language and means for reproducing the computer desktop that includes the program written for use in the foreign language, utilizing text from the second language.

Another embodiment of the present invention can include a machine readable storage being programmed to cause a machine to perform the various steps described herein.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention provides a solution for testing software intended for users that speak different languages. The present invention allows a quality assurance (QA) engineer, or other test personnel, to test software that is written for use by persons that speak a language other than that of the tester. That is, the intended users speak a language that is foreign to that spoken by the QA engineer. In accordance with the inventive arrangements disclosed herein, the present invention provides a real-time, or near real-time, translation of displayed text from application and/or system software. Text from the software is translated from a first language to a second language in which the tester is proficient. This allows the QA engineer to test software without being proficient in the language of the software under test. Thus, software intended for use by Japanese speaking users can be tested by a QA engineer that is proficient only in English.

Figure 1:
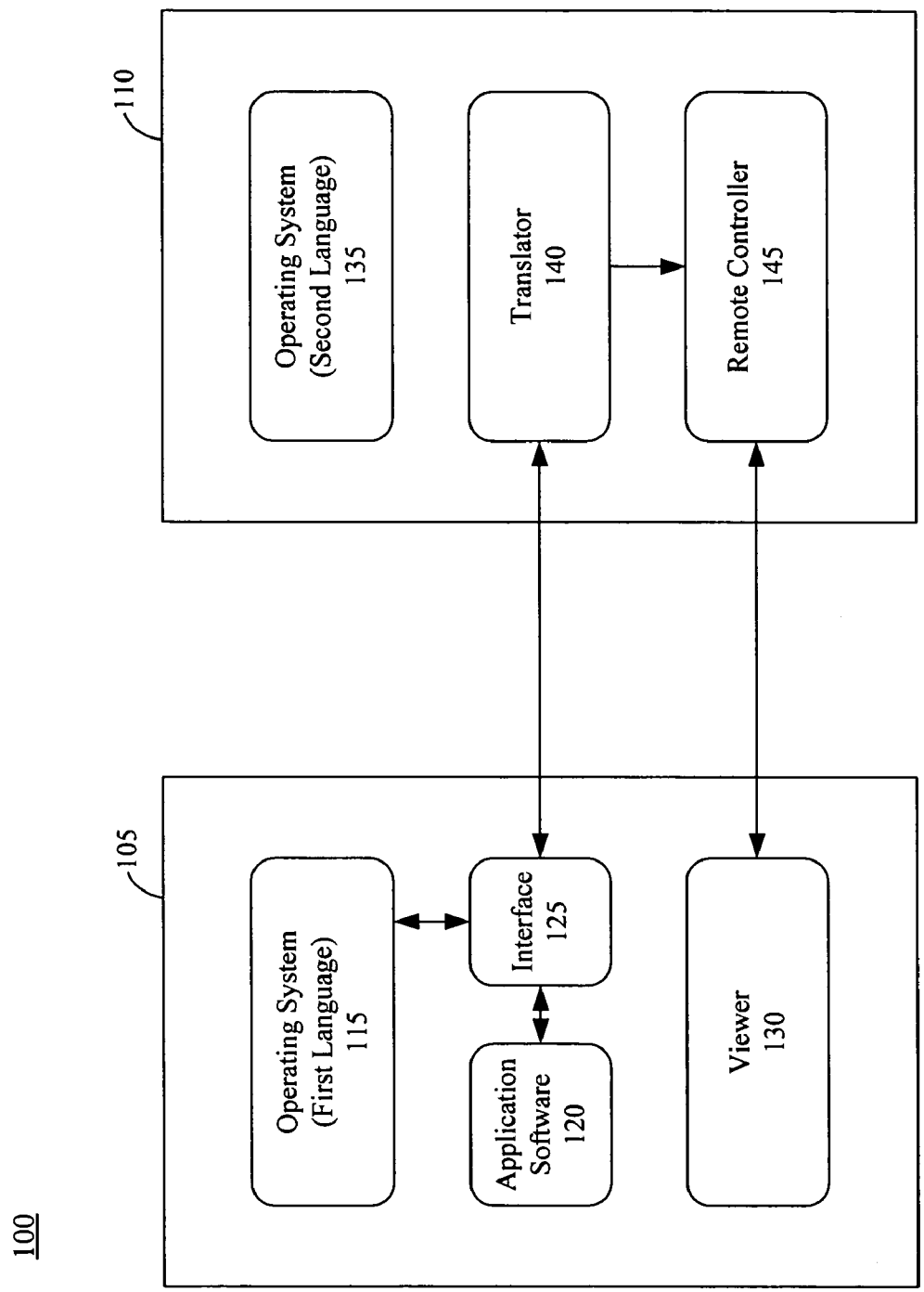
FIG. 1 is a schematic diagram illustrating a system for testing software in foreign languages in accordance with one embodiment of the present invention.

FIG. 1 is a schematic diagram illustrating a system 100 for testing software in different languages in accordance with one embodiment of the present invention. As shown, system 100 can include two information processing systems 105 and 110. Each of the information processing systems 105 and 110 can be implemented as a general purpose computer system, a server, a portable computer, or the like (hereafter "computer system"). Computer system 105 and computer system 110 each can include a display screen (not shown).

Computer system 105 can include an operating system (OS) 115 intended for use by speakers of a first language. That is, the OS 115 can be a foreign language OS, such as one intended for use by speakers of Japanese, Italian, Chinese, or any other language that is different from that of the OS 135. OS 135, disposed within computer system 110, can be intended for use by speakers of a second language such as English. The OS 115 can be localized in that it can be limited to executing solely within computer system 105. OS 135 can be localized in similar fashion within computer system 110. In this embodiment, the QA engineer using system 100 will likely have little or no proficiency in the first language used by OS 115, but have at least minimal proficiency with the second language used by OS 135.

Computer system 105 further can include application software 120. Application software 120 can be configured to execute within OS 115 and further can be configured for use by users proficient in the first language. The application software 120 can execute within computer system 105 to undergo testing. Notwithstanding, it should be appreciated that one or more aspects of the OS 115 can be tested as well. In that case, application software 120 can be excluded, or not executed, depending upon the particular functions and software, i.e. application or system, undergoing testing.

An interface 125 also is included which facilitates communication with a translator program 140. In one embodiment of the present invention, the interface 125 can be one or more accessibility application programming interfaces (API's). Accessibility API's provide programmatic access to user interface elements, whether in application software or system software. One example of accessibility API's can include Microsoft® Active Accessibility® available from Microsoft Corporation of Redmond, Wash. It should be appreciated that the particular accessibility interface or API can vary according to the type of OS used.

Accessibility API's provide other programs, such as the translator program. 140, with the ability to obtain information about or manipulate user interface elements corresponding to application software 120 and/or OS 115. Thus, using accessibility. API's, user interface objects can be identified. Further, attributes of the interface objects, such as text that the interface object causes to be displayed upon a display screen, can be obtained.

In another embodiment, the interface 125 can be a program that is capable of capturing an image from the desktop displayed by computer system 105. The captured image would include the text to be translated. The interface 125 can be configured to capture images and utilize a text extraction technology, such as optical character recognition or another image processing technique, to obtain text specified within the captured image. Once extracted, the text can be provided to the translator program 140.

The viewer 130 can be any of a variety of remote control applications which facilitate control of a remote computer system, referred to as a client, from another computer system, referred to as the host. The viewer 130 allows an operator of computer system 105, the host in this case, to view the desktop, or a portion of the desktop, of another computer system such as computer system 110. The viewer 130 interacts with remote controller 145, which is software that facilitates control over one or more aspects of computer system 110 from the viewer 130. In one embodiment, the remote controller 145 allows the operator of computer system 105 to view at least a portion of the desktop of the computer system 110 via the viewer 130. In another embodiment, the operator of computer system 105 can take control of one or more aspects of computer system 110.

The translator 140 is a program that is configured to receive text input in a first language and translate the received text into a second and different language. Accordingly, the translator 140 can receive text from the interface 125, whether the text was obtained using accessibility API's and/or image capture/text extraction technology, and translate that text to a specified language. In one embodiment, the specified language can be the language for which OS 135 has been configured. The invention, however, is not so limited.

In operation, text in a first language, such as Japanese, can be presented upon a desktop or other graphical user interface for the computer system 105. This text can be presented within a dialog box, within a document, used as a label for a menu or other visual construct, or the like. For example, such text can be text that is not selectable using a cursor or pointer. In any case, the text can be obtained using accessibility API's and/or image capture as described herein.

The text can be provided to the translator program 140. The translator program 140 translates the received text to a specified language. The translation can be displayed upon a display screen of computer system 110. An operator of computer system 105 can view the translated text from the display screen of computer system 105 using the viewer 130 and companion remote controller 145.

Figure 2:
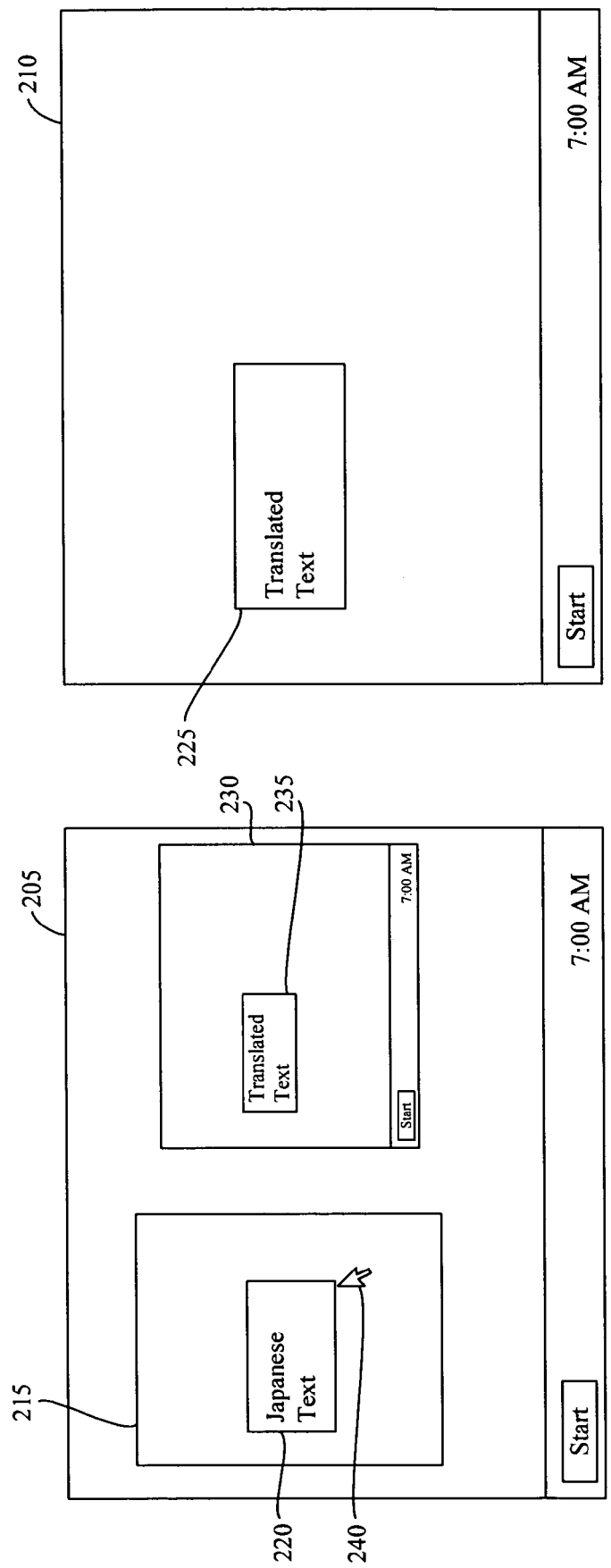
FIG. 2 is a pictorial illustration of desktop views for two information processing systems as described with reference to FIG. 1.

FIG. 2 is a pictorial illustration of desktop views 205 and 210 for two computer systems as described with reference to the system of FIG. 1. View 205 can correspond to a desktop view that can be presented upon a display screen for computer system 105 of FIG. 1. View 210 can correspond to a desktop view that can be presented upon a display screen for computer system 110 of FIG. 1. As shown, view 205 can include a window 215 corresponding to application software under test. As noted, however, the present invention is not limited to testing application software as aspects of an OS also can be tested without executing such application software.

A window 220 within view 205 can include text in the Japanese language. The window 220 can be generated by the OS and/or the application software as the case may be. Window 220 can be a pop-up style window, a dialog box, or any of a variety of other user interface object types as are known in the art of graphical user interfaces. For example, text to be translated can be included in a menu construct, within a text window of a word processor, or the like.

According to one embodiment, the text can be identified by a pointer 240. The operator can move the pointer to a location that is proximate to, or on top of, the text and/or user interface object specifying the text to be translated. In another aspect, a region surrounding the pointer 240 can be defined. The region can be any of a variety of different geometric shapes having a predefined area. Accordingly, any text and/or user interface objects causing text to be displayed that are in contact with the region, can be identified. Thus, in the case of accessibility API's, the pointer 240, including any region surrounding the pointer, can be used to identify the user interface object and query such object for the text to be translated.

In the case where an image is captured, the image can be a representation of the area surrounding the pointer 240. This can serve to limit the size of the image that is captured thereby speeding up processing time with regard to text extraction. Alternatively, an image of the entire desktop can be captured and processed to extract text. In that case, if so desired, the pointer 240 location can be used to prioritize which portions of the image are to be processed before others. Notwithstanding, it should be appreciated that all text displayed upon the display screen 205 can be identified using either image processing and/or accessibility API technology.

Any of a variety of different key commands and/or graphical controls can be provided to trigger the translation process described herein. In one embodiment, however, keeping the pointer 240 stationary at a given location for a minimum amount of time can trigger such processing, particularly when the pointer indicates text to be translated as described herein. In another embodiment, the process described herein can activate automatically at predetermined time intervals. Despite the mechanism used to trigger translation processing, it should be appreciated that the text can be automatically identified and/or extracted and then translated responsive to a defined triggering event.

In any case, the text within window 220, once identified and obtained, can be provided to the translator. As shown, view 210 includes a window 225. Window 225 can be any of a variety of different interface elements or window types. In one embodiment, window 225 can be similar to, or of the same type as, window 220. Regardless of the appearance of window 225, the translation of the Japanese text obtained from window 220 can be displayed therein.

Notably, the position of window 225 within view 210 can correspond to that of window 220 in view 205. That is, the position of window 225 within view 210 approximates the position of window 220 within view 205. In this case, windows 220 and 225 are located in the mid-left portion of views 205 and 210 respectively.

Within view 205 is a window 230 which includes a representation of the desktop, or a portion of the desktop, shown in view 210. The window 230 is generated by the viewer discussed in reference to the system of FIG. 1. Accordingly, within window 230 is shown a representation 235 of window 225. In this manner, a QA engineer can obtain real-time, or near real-time, translations of foreign language text of an OS or an application program. Such translations can be provided on-demand responsive to the triggering event.

Figure 3:
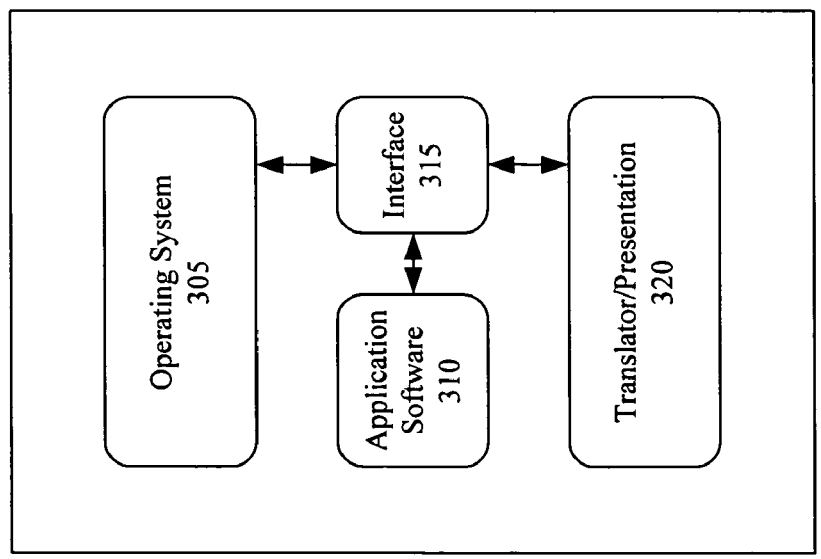
FIG. 3 is a schematic diagram illustrating a system for testing software in foreign languages in accordance with another embodiment of the present invention.

FIG. 3 is a schematic diagram illustrating a system 300 for testing software in different languages in accordance with another embodiment of the present invention. In general, the system 300 can function in a manner that is similar to the system of FIG. 1, with the exception that only a single computer system is needed. Accordingly, viewer and remote controller technologies are not required in this embodiment.

As shown, the computer system 300 can include an OS 305, application software 310, an interface 315, and a translator/presentation module (translator) 320. The OS 305 can be a foreign language OS as described with reference to FIG. 1. That is, the OS 305 can be intended for users proficient in a language other than that of the QA engineer. The application software 310 can be an application under test. Still, as noted, if aspects of the OS 305 are to be tested, the application software 310 need not be incorporated or executed.

The interface 315 can obtain text displayed upon a display screen (not shown), such as a computer monitor or other visual display, of the computer system 300. Such text can be specified by, or within, a user interface object as previously described. In one embodiment, the interface 315 can be a collection of one or more accessibility API's. In another embodiment, the interface 315 can be an image capture and text extraction technology. In either case, rather than locating the translator 320 within a different computer system, the translator 320 can execute within the computer system 300.

As such, the translator 320 can be configured to run within the OS 305. The translator 320 further can be configured to display translated text upon the visual display of computer system 300.

Figure 4:
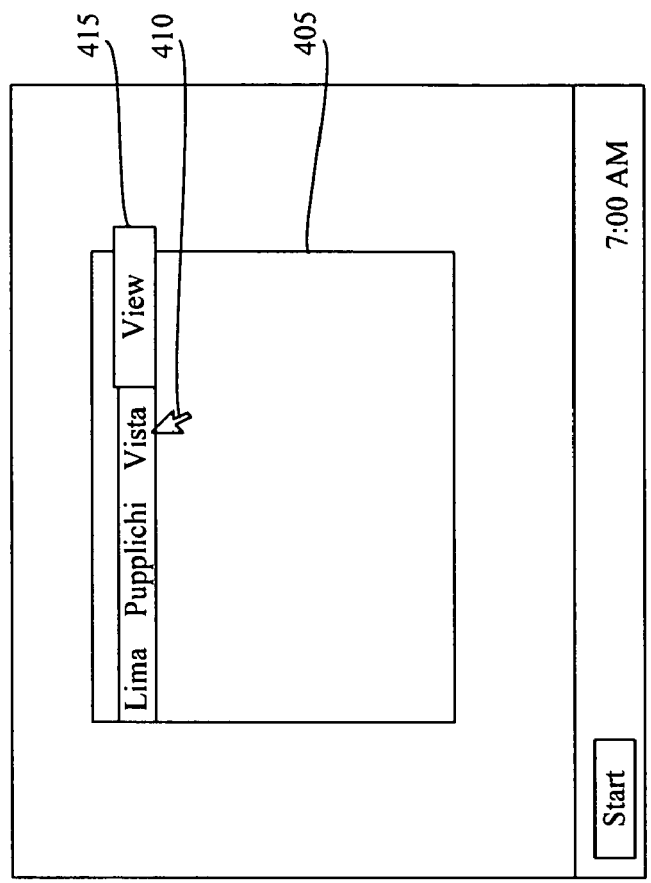
FIG. 4 is a pictorial illustration of a desktop view for an information processing system as described with reference to FIG. 3.

FIG. 4 is a pictorial illustration of a desktop view 400 for the computer system described with reference to FIG. 3. As shown, the view 400 can include a window 405 that corresponds to application software. The window 405 illustrates the case where Italian software is under test. Accordingly, the available menu items are in the Italian language. The QA engineer has moved pointer 410 near the text "Vista". The text corresponding to this user interface object can be identified through image processing and/or accessibility API's. The Italian text is provided to the translator. Once processed and translated into a second and different language in which the QA engineer is proficient, the translated text "View" can be displayed as a tool-tip in window 415.

It should be appreciated that window 415 need not be a tool-tip style window or interface, but rather can be any of a variety of different window types. Further, window 415 need not be positioned proximate to the pointer 410 or translated text as shown. In another embodiment, a link to an electronic document can be presented within the window 415. In that case, selecting the link can cause the electronic document to be opened. This embodiment can be used in cases where a significant amount of text is to be translated that would not be easily readable within a smaller window or interface.

As discussed, the pointer 410 can indicate text to be translated by hovering over the text or pointing to the text. Alternatively, any text and/or interface objects within a predefined area surrounding the pointer 410 can be identified. In one embodiment, a QA engineer can trigger the translation function and use the pointer 410 to draw a shape surrounding or contacting the text to be translated. Such a function can be similar to drawing programs in which users bound or select objects by drawing an expandable shape such as a rectangle or circle.

Figure 5:
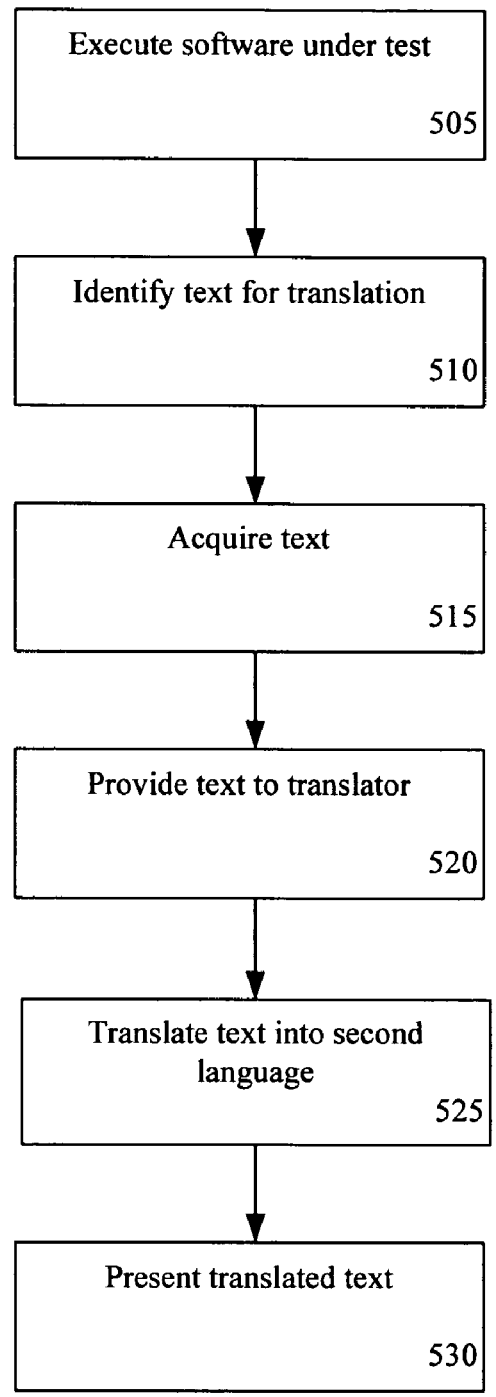
FIG. 5 is a flow chart illustrating a method of testing software in accordance with yet another embodiment of the present invention.

FIG. 5 is a flow chart illustrating a method 500 of testing software in accordance with yet another embodiment of the present invention. In step 505, the software under test can be executed. As noted, such software can be application software and/or system software. The software under test can be for use by persons proficient in a first language, or one foreign to the QA engineer. In step 510, text in the first language can be identified for translation. The text can be any text presented on a display screen. Such text can be selectable text or non-selectable text.

In one embodiment, text can be identified using a pointer. The pointer can be moved to point to the text to be translated. Alternatively, a region surrounding the pointer can be defined such that any text within or in contact with that region can be identified for translation. The text can be identified responsive to detecting a particular triggering event such as the pointer remaining over, or proximate to, a user interface object, or text displayed by a user interface object, for a minimum amount of time. In another embodiment, any text displayed upon the desktop can be identified for translation.

In step 515, the text can be acquired. If accessibility API's are used, the text can be acquired by querying the software under test, which can include the operating system. If image capture is used, then text extraction technology can be used to acquire the text from the captured image.

In step 520, the text can be provided to a translator. As noted, the translator can execute within the same computer system in which the software under test is executing, or on another computer system. Appreciably, if located in a different computer system, that computer system can be located near, or remote from, the computer system executing the software under test.

In step 525, the text can be translated to the second and different language. In step 530, the translated text can be presented. As noted, the translated text can be presented using pop-up style windows or other user interface elements. In the event that the translator executes within a different computer system than the software under test, viewer and remote control applications can be used. In that case, all, or a portion of, the desktop of the different computer system can be viewed from the display screen or desktop of the computer system executing the software under test.

The various embodiments disclosed herein have been presented for purposes of illustration only and should not be construed as limiting the scope of the present invention. For example, in one embodiment, offline, batch-style processing can be performed in cases where the amount of text to be translated would unduly slow the operation of the computer system executing the software under test. In such a case, translated text can be stored in a file for later viewing. Alternatively, text in the first language that is acquired from a display screen can be saved in a file for translation at a later time.

The languages used in describing the various embodiments presented herein have been provided as examples and are not intended to limit the present invention. It should be appreciated that any two different languages can be used such that text in the first language is translated into text in the second language. Also, it should be recognized that one or more of the computer programs described herein can be formed of a plurality of smaller programs, which collectively, provide the functions described herein. Further, two or more of the programs discussed herein can be combined into a larger, more complex program that provides the same functionality as the combined programs.

The inventive arrangements disclosed herein provide a solution for testing software written in different languages. Using the present invention, a QA engineer can test software that is written in, or intended for use by, users that speak, or are proficient in, a language other than that used by the QA engineer. The arrangements described herein provide a real-time, or near real-time system, which can provide translations on-demand.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or software, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of testing a computer program written for use in a foreign language, said method comprising:
displaying a computer desktop that includes a program written for use in a first language on a display screen of a first information processing system executing an operating system for use in the first language, wherein the first language is a foreign language;
identifying text presented within the display screen in accordance with a location of a pointer defining a location of the text within the computer desktop, wherein the text is in the first language;
automatically acquiring the text from the display screen;
responsive to the identifying text presented within the display screen, translating the text from the first language to a second language within a second information processing system executing an operating system for use in the second language or an operating system for use in the first language;
reproducing a representation of at least a portion of the computer desktop that includes the program written for use in the foreign language, by the second information processing system, where the representation of at least a portion of the computer desktop includes the translated text in the second language such that, based on the first language text location determined from the location of the pointer, the translated text is positioned within the representation portion of the computer desktop approximate a relative position of the text in the first language within the computer desktop upon the display screen of the first information processing system; and
concurrently displaying the representation of at least a portion of the computer desktop containing the translated text in the second language and the computer desktop within the display screen of the first information processing system, the representation being displayed as a sub-portion of the computer desktop.

2. The method of claim 1, said automatically acquiring step comprising:
obtaining an image of at least a portion of the display screen including the text; and
extracting text from the image.

3. The method of claim 1, said automatically acquiring step comprising querying at least one of the operating system of the first information processing system or the program using an accessibility application programming interface that accesses user interface elements displayed upon the display screen to obtain the text.

4. The method of claim 1, said reproducing step comprising displaying a selectable link to an electronic document specifying the translated text.

5. The method of claim 1, wherein at least said reproducing step is performed responsive to detecting the pointer at the location for at least a minimum amount of time.

6. A machine readable storage, having stored thereon a computer program having a plurality of code sections executable by a machine for causing the machine to perform a method of testing a computer program written for use in a foreign language, said method comprising:
displaying a computer desktop that includes a program written for use in a first language on a display screen of a first information processing system executing an operating system for use in the first language, wherein the first language is a foreign language;

identifying text presented within the display screen in accordance with a location of a pointer defining a location of the text within the computer desktop, wherein the text is in the first language;

automatically acquiring the text from the display screen;

responsive to the identifying text presented within the display screen, translating the text from the first language to a second language within a second information processing system executing an operating system for use in the second language or an operating system for use in the first language;

reproducing a representation of at least a portion of the computer desktop that includes the program written for use in the foreign language, by the second information processing system, where the representation of at least a portion of the computer desktop includes the translated text in the second language such that, based on the first language text location determined from the location of the pointer, the translated text is positioned within the representation portion of the computer desktop to approximate a relative position of the text in the first language within the computer desktop upon the display screen of the first information processing system; and concurrently displaying the representation of at least a portion of the computer desktop containing the translated text in the second language and the computer desktop within the display screen of the first information processing system, the representation being displayed as a sub-portion of the computer desktop.

7. The machine readable storage of claim 6, said automatically acquiring step comprising:

obtaining an image of at least a portion of the display screen including the text; and extracting text from the image.

8. The machine readable storage of claim 6, said automatically acquiring step comprising querying at least one of the operating system of the first information processing system or the program using an accessibility application programming interface that accesses user interface elements displayed upon the display screen to obtain the text.

9. The machine readable storage of claim 6, said reproducing step comprising displaying a selectable link to an electronic document specifying the translated text.

10. The machine readable storage of claim 6, wherein at least said reproducing step is performed responsive to detecting the pointer at the location for at least a minimum amount of time.

11. A system for testing a computer program written for use in a foreign language comprising:

a first information processing system comprising a display screen and executing an operating system for use in a first language and a program written for use in the first language, wherein the first language is a foreign language;

a second information processing system executing an operating system for use in the first language or a second language, where the second information processing system translates text from the first language to the second language;

where the first information processing system displays a computer desktop that includes the program on the display screen;

where the first information processing system identifies text presented within the display screen in accordance with a location of a pointer defining a location of the text within the computer desktop, wherein the text is in the first language;

where the second information processing system automatically acquires the text from the display screen and, responsive to the identifying text presented within the display screen, translates the text from the first language to the second language;

where the second information processing system reproduces a representation of at least a portion of the computer desktop that includes the program written for use in the foreign language, where the representation of at least a portion of the computer desktop includes the translated text in the second language such that, based on the first language text location determined from the location of the pointer, the translated text is positioned within the representation portion of the computer desktop to approximate a relative position of the text in the first language within the computer desktop upon the display screen of the first information processing system; and wherein the first information processing system concurrently displays the representation of at least a portion of the computer desktop containing the translated text in the second language and the computer desktop within the display screen, the representation being displayed as a sub-portion of the computer desktop.

12. The system of claim 11, wherein the first information processing system comprises at least one of an image capture module configured to obtain an image including the text and extract the text from the image or an accessibility application programming interface for obtaining the text.

* * * * *

UNITED STATES PATENT AND TRADEMARK OFFICE
CERTIFICATE OF CORRECTION

PATENT NO. : 7,669,198 B2 Page 1 of 1
APPLICATION NO. : 10/992585
DATED : February 23, 2010
INVENTOR(S) : Poonam Parijat Chitale It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1497 days.

Signed and Sealed this

Seventh Day of December, 2010

David J. Kappos
*Director of the United States Patent and Trademark Office*